United States Patent [19]

Hildebrandt

[11] 4,252,140
[45] Feb. 24, 1981

[54] VALVE GRAVITY-CONTROLLED IN DEPENDENCE UPON THE FLIGHT ATTITUDE OF AN AIRCRAFT

[75] Inventor: Florian Hildebrandt, Günding, Fed. Rep. of Germany

[73] Assignee: Motoren- und Turbinen-Union Munchen GmbH, Munich, Fed. Rep. of Germany

[21] Appl. No.: 55,772

[22] Filed: Jul. 9, 1979

[30] Foreign Application Priority Data

Jul. 11, 1978 [DE] Fed. Rep. of Germany ....... 2830337

[51] Int. Cl.³ ............................................ F16K 17/36
[52] U.S. Cl. .................................................... 137/38
[58] Field of Search ............................... 137/38, 39, 43

[56] References Cited
U.S. PATENT DOCUMENTS

| | | | |
|---|---|---|---|
| 2,239,098 | 4/1941 | Hunter | 137/38 |
| 2,324,464 | 7/1943 | Parker | 137/38 |
| 2,409,220 | 10/1946 | Melichar | 137/38 |
| 2,933,095 | 4/1960 | Rumsey | 137/38 |
| 4,185,651 | 1/1980 | Paulsen | 137/38 |

*Primary Examiner*—Robert G. Nilson
*Attorney, Agent, or Firm*—Scully, Scott, Murphy & Presser

[57] ABSTRACT

Valve gravity-controlled in dependence upon the current flight attitude of an aircraft, which includes an outer valve housing a plurality of equally spaced conduit connectors for the inlet of a flowing medium. A collector chamber is located between the outer valve and an inner valve housing of the valve, the collector chamber communicating with an outlet for the medium. Spring loaded valve members are associated with each inlet conduit connector of which at least one establishes communication between the respective inlet connector and the collector chamber under the gravity-controlled action of a ball arranged in the inner valve housing.

10 Claims, 5 Drawing Figures

4,252,140

VALVE GRAVITY-CONTROLLED IN DEPENDENCE UPON THE FLIGHT ATTITUDE OF AN AIRCRAFT

BACKGROUND OF THE INVENTION

1. Field of the Invention

The present invention relates to a valve which is gravity-controlled as a function of the current flight attitude of an aircraft.

2. Discussion of the Prior Art

In turbojet engines for aircraft the gearbox which is provided, for instance, for driving the accessories, is connected to a pressurized oil lubrication circuit.

In this arrangement the gearbox housing constitutes a receptacle through which there periodically circulates the requisite amount of oil, in essence, the oil is admitted therein and then again discharged therefrom. As a result of changes in flight attitudes the gearbox oil flows into gearbox areas other than in the direction of the oil sump, operating the gearbox oil affords not insignificant technical difficulties. Hereby, in addition to changes in the flight attitudes consideration must also be given to acceleration forces of relatively high intensities caused by different flight maneuvers which act on the gearbox as well as the inherent inertia of the oil in the gearbox.

SUMMARY OF THE INVENTION

Accordingly, it is a basic object of the present invention to provide a valve by means of which, in a simple manner, the gearbox oil can be aspirated or scavenged without difficulties notwithstanding changes in flight attitudes and maneuvers.

It is a more specific object of the present invention to provide a valve of the above-mentioned type which is characterized by the following features.

(a) The valve comprises an outer housing having several, preferably mutually uniformly spaced conduit connectors for the ingress of a flowing medium;

(b) A collecting chamber is formed between the outer housing and an inner housing of the valve, which communicates with a return conduit;

(c) Each inlet has a spring-loaded valve member associated therewith, of which at least one presents a communication between the respective inlet and the collector chamber under the gravity-controlled action of a ball which is arranged within the inner valve housing.

The thus constructed valve distinguishes itself through its relatively simple construction, and its rapid and easy response relationship, particularly since the gravity-operated ball associated with the valve causes no significant frictional forces.

BRIEF DESCRIPTION OF THE DRAWINGS

Reference may now be had to the following detailed decription of the invention in conjunction with the accompanying drawings, in which.

DETAILED DESCRIPTION

Figure 1:
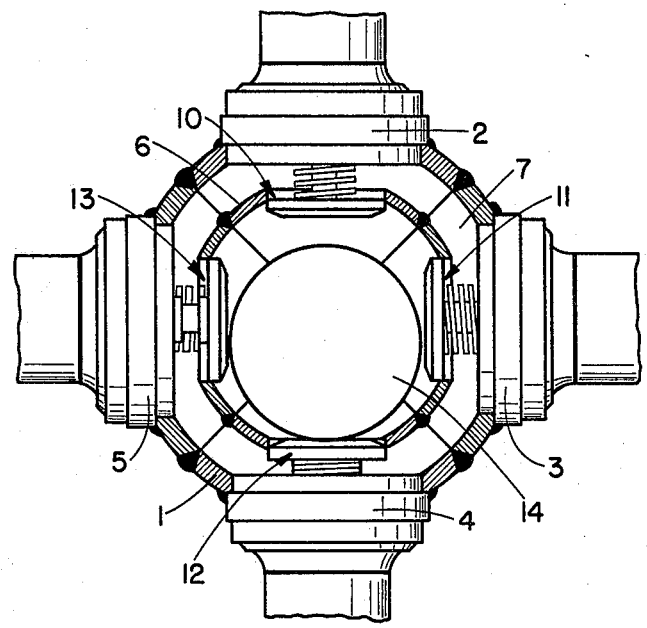
FIG. 1 is a partly sectioned plan view of the valve, projected in the drawing plane.

Referring now to FIG. 1, the valve consists of an outer housing or body 1 having four mutually equally offset conduit connectors 2, 3, 4 and 5 for the admission of a flowing medium which, for present purposes, would be a drive or gearbox oil.

In this arrangement, a collector chamber 7 is arranged between the outer valve housing 1 and an inner valve housing 6, the chamber communicating with an outlet conduit 8 (FIG. 2) which, in turn is connected to a scavenge pump. Each inlet has its own spring-loaded valve member 10, 11, 12, 13 associated therewith, of which at least one forms a communication between the respective inlet and the collector chamber 7 under the gravitational effect of a ball 14 arranged within the inner valve housing 2.

Figure 2:
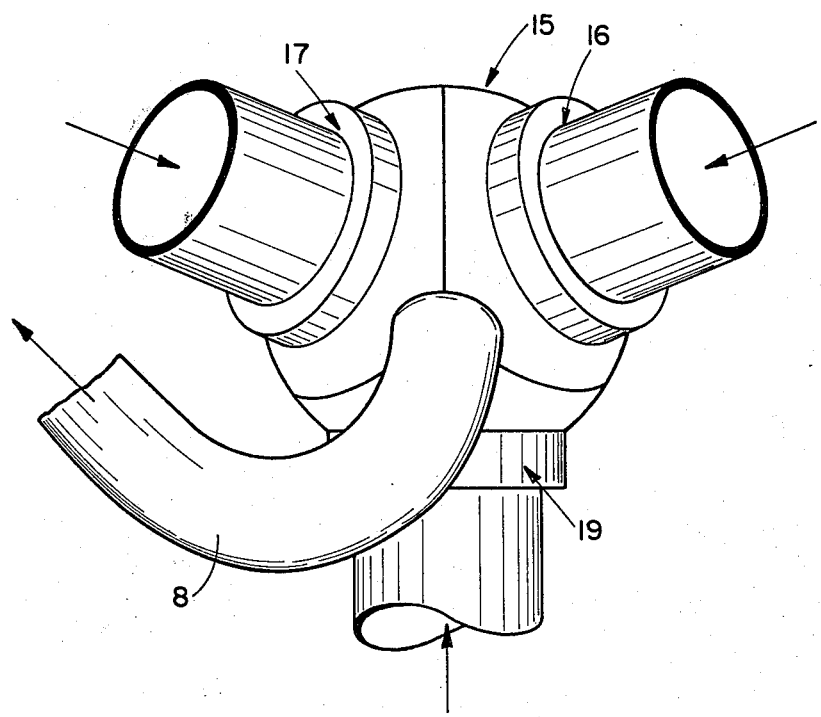
FIG. 2 is a perspective view of an alternative embodiment having conduit connections for the flow to the valve in two different planes.
Figure 5:
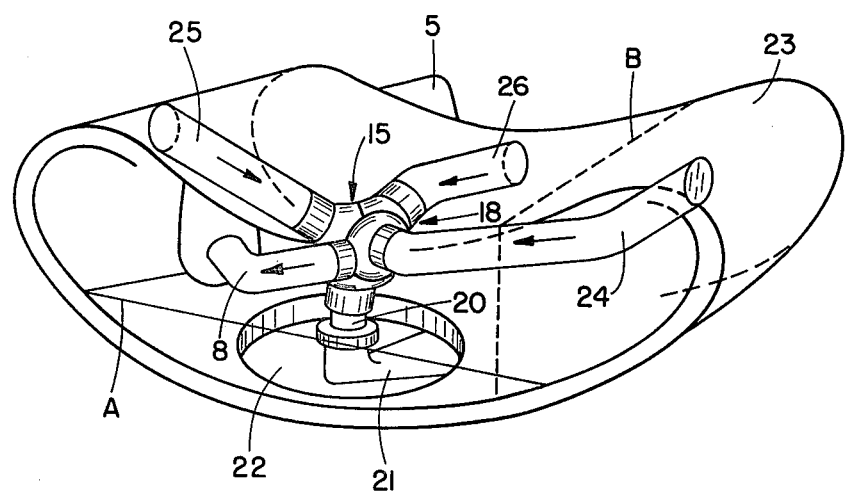
FIG. 5 is a perspective representation of a schematically drawn gearbox housing together with a valve having scavenging points located in various areas of the housing.

With respect to its external configuration, FIG. 2 illustrates in conjunction with FIG. 5, a more practical arrangement of a valve 15 which has three conduit connectors 16, 17, 18 spaced 120° apart and in a common plane for the admission of oil, whereas the fourth conduit connector 19 is, in this case, in alignment with the vertical centerline of the valve and in communication, through a pipe 20 (FIG. 5), with a suction tube 21 which terminates in the oil sump 22 of the gearbox housing 23.

As shown in FIG. 5, the conduit connectors 16, 17, 18 are connected to conduits 24, 25, 26 whose aspirating openings extend into three different zones of the banana-shaped gearbox housing 23.

Figure 3:
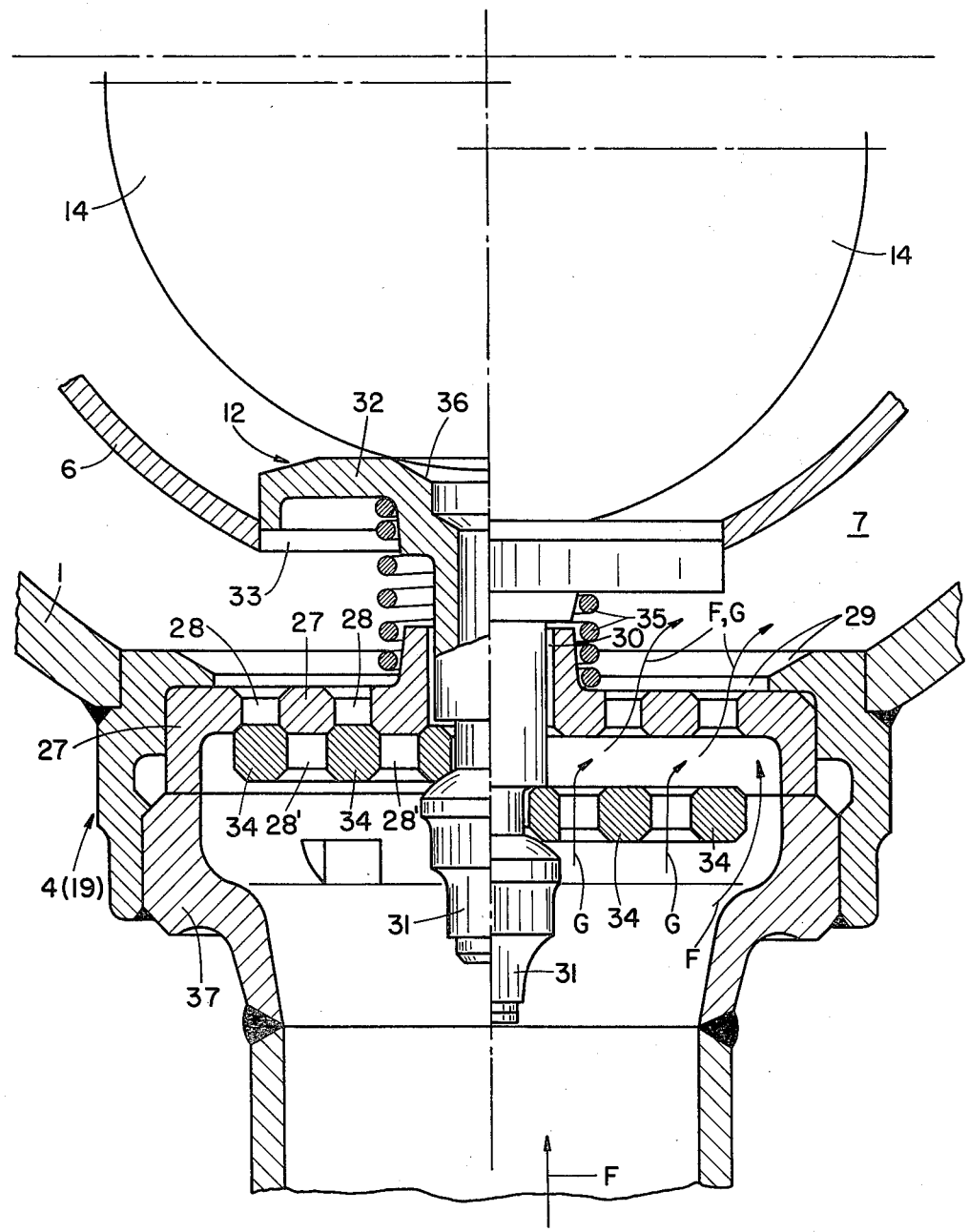
FIG. 3 is a sectional view, illustrating two different operative end positions of a valve body for a valve pursuant to FIG. 1 or 2.

Having reference to FIG. 3, a pressure plate 27 is inserted into each conduit connector, here illustrated as a conduit connector 4 or 19 which can be placed in communication with the oil sump 22, with the pressure plate exhibiting several, circumferentially equally spaced flow passages 28 communicating, through the opening 29 of the conduit connector 4 or 19, with the collector chamber 7. The pressure plate 27 further includes an axially centrally located through-aperture 30 for the cylindrical shaft 31 of the valve member, for instance 12 which, on the one side, is arranged for axial displacement within a bore 33 of the inner housing 6 together with a valve poppet 32 facing towards the ball 14 and which, on the other side, is provided with a sealing disc 34 to either close or open the flow passages 28 in the pressure plate. A return spring 35 is arranged between the valve poppet 32 and the pressure plate 27.

According to the right-hand half of FIG. 3, the ball 14 can thus, under the force of gravity, displace the valve member 12 against the force of the return spring 35 to an extent sufficient for the sealing disc 34 to be lifted from the flow passages 28 so as to allow the flow of oil as is indicated in the drawing by arrows F and G.

As is further shown in FIG. 3, the valve member 12 has a sleeve-like shape, and has a conical detent 36 for the ball on side of the poppet 32 facing the ball 14.

As is further apparent from FIG. 3, the sealing disc 34 includes conical end surfaces for properly sealing the flow passages 28 and the through-aperture 30 in the pressure plate 27, and it is also provided with passages 28 which in the open position of the valve are also opened (see oil flow G).

In the embodiment illustrated in FIG. 3, the pressure plate 27 is fixed in the position shown by means of a pipe end 37 which is welded to the conduit connector 4 or 19.

Figure 4:
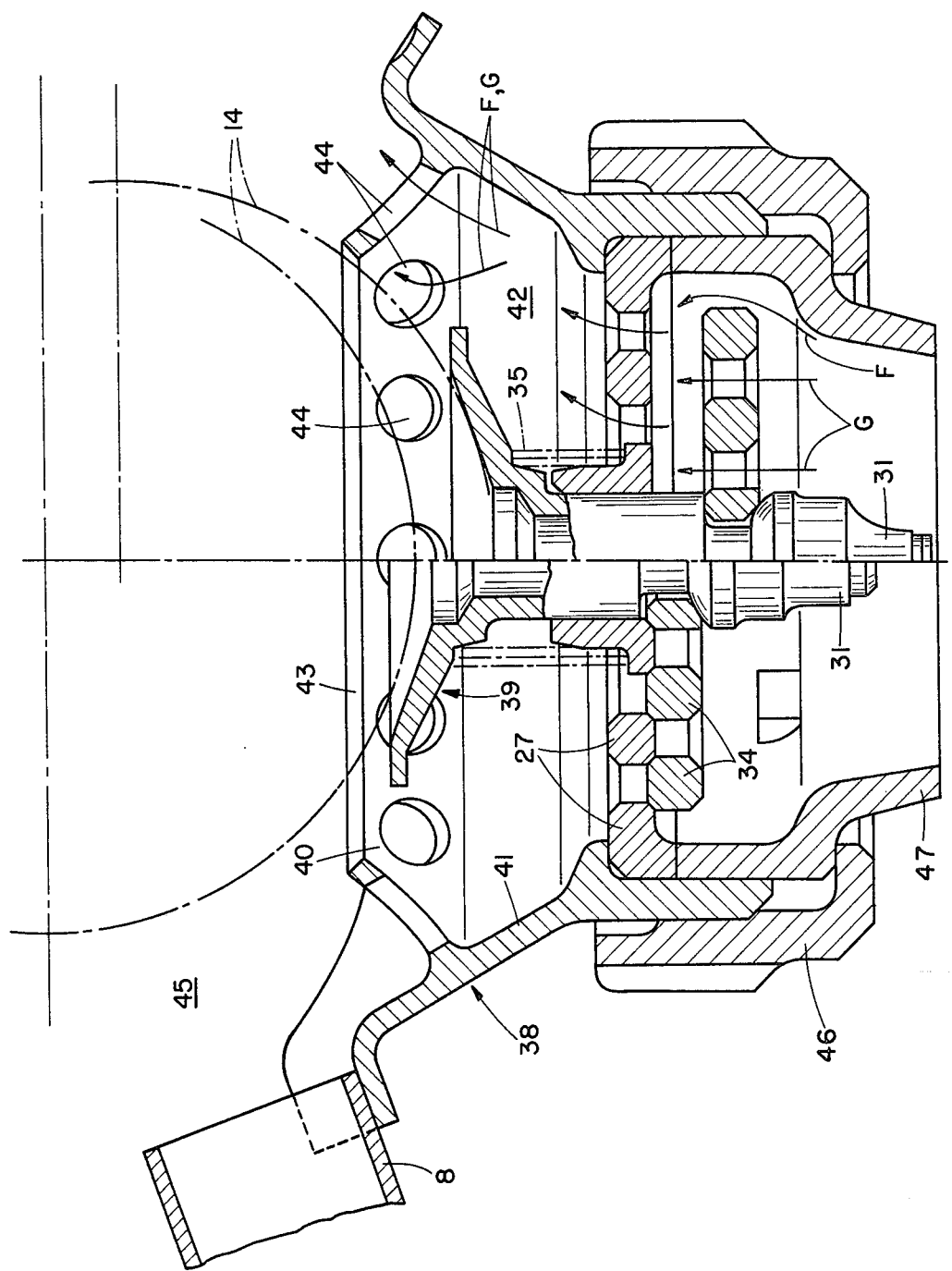
FIG. 4 is a sectional view, illustrating two different operative end positions of a further valve body, with details of valve construction modified from those in FIGS. 1 to 3.

Employing the same reference numerals for essentially unchanged components, FIG. 4 illustrates an embodiment which differs from that of FIG. 3 primarily in that the valve essentially consists of several conduit connectors in a star-shaped and preferably, equally spaced arrangement which are, concurrently, truncated-conical constituents of the outer valve housing.

In this arrangement, the conduit connectors 38 also evidence inner wall sections 40 which are drawn in towards the ball 14, which extend rotationally symmetrically with the axis of the valve body 39 and which encompass an annular intermediate chamber 42 between themselves and a wall portion 41 of a conduit connector 38, on the one hand, and the pressure plate 27 as well as components of the valve member, on the other hand, which in the fully opened position of the valve member 39 is essentially sealed by the ball 14 along the outer rim 43 of the wall section 40. By means of bores 44 in the wall section 40, a flow of oil F, G will be effected from the annular chamber 42 through the bores 44, into the interspaces 45 essentially located between the remaining conduit connectors and the ball 14, and from which the oil will then be scavenged through the outlet conduit 8.

With further reference to FIG. 4, a pipe clamp 46 is screwed onto the conduit connector 38, by means of which both an inlet conduit section 47 and the pressure plate 27 can be fastened to the fitting 38.

In the interest of a simple and inexpensive manner of manufacture of the valve designs described above, their housings should preferably be made of equally formed, cone-shaped or truncated cone-shaped components which can then be welded together.

In FIG. 5 the normal service level for the oil is identified by the letter A. In this arrangement, the force of gravity which acts vertically on the ball 14 causes the valve member associated with the scavenge or suction tube 21, in essence 12 (FIG. 1), to be depressed so as to ensure the flow of oil between the oil sump 22 and the chamber 7 (FIG. 1) of the valve and, through the return conduit 8, to the scavenge pump 5. In this case of normal service, the outlets of the conduits 24, 25 and 26 are above the oil level A, whereas the associated valve members, for instance, 10, 11 and 13, remain in the shutoff position.

Then when the oil level shifts, for example, to the position B indicated by the phantom line as a result of a 90° roll angle of the aircraft, due to gravity action on the ball 14, the valve member 11 associated with the conduit 24 for the oil to be scavenged is opened so that oil is scavenged through the opening of conduit 24 lying below oil level B and can pass through the chamber 7 of the valve to the outlet conduit 8 and on to the scavenge pump 5. In this case the valve members 10, 12 and 13 associated with the outlets of the conduit 20, 25 and 26 which are now above the oil level B will remain, for example, in their shutoff position.

For example, due to the accelerating forces acting on the gearbox casing, the oil level might conceivably shift such that, for instance, the conduits 24, 26 and their outlets are below the oil level while the conduit 20 with the scavenge tube 21, as well as the conduit 25 with its opening are thereabove. In this and similar instances, then, the ball 14 would be in a position to concurrently open two valve members, here the valve members 10 and 11 communicating with the conduits 24 and 26, whereas the valve members 12, 13 communicating with the scavenge tube 21 and with the conduit 25 will remain in their shutoff positions.

In cooperation with the banana-shaped construction of the gearbox housing 23 ascertainable from FIG. 5 as well as the suitably selected positioning of the outlet apertures, the oil scavenging can take place from the spatially most favorable interior zones.

The valves illustrated in FIGS. 1 to 4 are in the installed condition suitably sealed off from their environment so that they can optionally be arranged within (FIG. 5) or exteriorly of the gearbox housing, depending upon the space available to accommodate them.

The inventive concept is naturally applicable to similar a use of the valve with all other container constructions from which a lubricating and/or cooling fluid must be continually scavenged wherein the receptacle is subject to frequent changes in position during service, particularly in aircraft.

What is claimed is:

1. Gravity-controlled valve in dependence upon the current flight attitude of an aircraft, comprising:
   (a) an outer valve housing a plurality of equally spaced conduit connectors for the inlet of a flowing medium;
   (b) a collector chamber communicating with an outlet for said medium;
   (c) spring loaded valve members associated with each said inlet conduit connector of which at least one establishes communication between the respective inlet connector and the collector chamber under the gravity-controlled action of a ball arranged in said valve housing.

2. Valve as claimed in claim 1, comprising a pressure plate inserted in each said conduit connector including a plurality of circumferentially equally spaced flow passages communicating through an opening in said connector with the collector chamber, said pressure plate including a centrally arranged through-aperture for a cylindrical shaft of the valve member arranged for axial sliding movement within a bore in the valve housing and with a valve poppet facing the ball, and said valve member being provided with a sealing disc for closing or opening the flow passages in the pressure plate; and a pressure return spring being arranged between the poppet and the pressure plate.

3. Valve as claimed in claim 2, said valve member having a sleeve-like shape and including a recess in the shape of a truncated cone for the ball on the side of the poppet facing the ball.

4. Valve as claimed in claim 2, said sealing disc including conical faces for sealing the flow passages and the through-aperture in the pressure plate, and including passages which in the open position of the valve are also opened.

5. Valve as claimed in claim 2, comprising clamps fastened to said conduit connectors for simultaneously locating the respective pressure plates.

6. Valve as claimed in claim 1, an inner valve housing of the valve, said inner and outer valve housings having spherical shapes.

7. Valve as claimed in claim 1, said conduit connectors being in the shape of truncated cones and forming a part of said outer valve housing.

8. Valve as claimed in claim 7, said truncated cone-shaped conduit connectors including inner wall sections which are bent inwards towards the ball of the valve, and extending in axial symmetry with the centerline of the respective valve member and including intermediate themselves and a wall portion of a conduit connector, an annular space which communicates through apertures in the wall section with the outlet.

9. Valve as claimed in claim 1, said outer valve housing being essentially composed of conduit connectors in a star-shaped arrangement.

10. Valve as claimed in claim 1, an inner valve housing of the valve, said outer and inner valve housing consisting of uniformly shaped and dimensioned components which are welded together.

* * * * *